US007648686B2

(12) United States Patent
Reinke et al.

(10) Patent No.: US 7,648,686 B2
(45) Date of Patent: Jan. 19, 2010

(54) ACTIVELY COOLED EXOTHERMIC REACTOR

(75) Inventors: Michael J. Reinke, Franklin, WI (US);
Jeroen Valensa, New Berlin, WI (US)

(73) Assignee: Modine Manufacturing Company, Racine, WI (US)

( * ) Notice: Subject to any disclaimer, the term of this patent is extended or adjusted under 35 U.S.C. 154(b) by 606 days.

(21) Appl. No.: 10/818,298

(22) Filed: Apr. 5, 2004

(65) Prior Publication Data

US 2005/0220684 A1 Oct. 6, 2005

(51) Int. Cl.
*B01J 19/00* (2006.01)
*F28F 9/00* (2006.01)
*F28F 3/00* (2006.01)
*F28F 3/12* (2006.01)
*F28F 3/14* (2006.01)

(52) U.S. Cl. .................. 422/198; 165/154; 165/162; 165/164; 165/166; 165/168; 165/169; 165/170

(58) Field of Classification Search ................ 422/198; 165/154, 162, 164, 166, 168–170
See application file for complete search history.

(56) References Cited

U.S. PATENT DOCUMENTS

| | | | | |
|---|---|---|---|---|
| 3,796,547 A | * | 3/1974 | Muenger | 422/200 |
| 3,923,009 A | * | 12/1975 | Sohma | 122/34 |
| 4,098,330 A | * | 7/1978 | Flower et al. | 165/166 |
| 4,438,809 A | * | 3/1984 | Papis | 165/166 |
| 5,360,679 A | * | 11/1994 | Buswell et al. | 429/19 |
| RE36,171 E | * | 3/1999 | Balling et al. | 422/171 |
| 6,073,686 A | * | 6/2000 | Park et al. | 165/144 |
| 6,190,624 B1 | * | 2/2001 | Romatier | 422/200 |
| 2001/0040025 A1 | * | 11/2001 | Jurisich | 165/148 |
| 2002/0021992 A1 | * | 2/2002 | Bass et al. | 422/196 |
| 2002/0033251 A1 | * | 3/2002 | Herzog et al. | 165/155 |

FOREIGN PATENT DOCUMENTS

| | | |
|---|---|---|
| DE | 197 16 470 C1 | 10/1998 |
| JP | 54-114852 | 9/1979 |
| JP | 60-153936 | 8/1985 |
| JP | 9-165202 | 6/1997 |
| JP | 2004037020 A * | 2/2004 |
| WO | WO 9409903 A1 * | 5/1994 |

OTHER PUBLICATIONS

Machine Translation of JP 2004-037020 A.*
English Translation of Yoshida et al (JP 2004-037020).*

* cited by examiner

*Primary Examiner*—Walter D Griffin
*Assistant Examiner*—Natasha Young
(74) *Attorney, Agent, or Firm*—Michael Best & Friedrich LLP

(57) ABSTRACT

A catalytic reactor including a heat exchanger and a method are provided for transferring heat to a coolant and a reaction fluid. The catalytic reactor includes a reaction fluid flow path, a reaction region, and a coolant flow path. A reaction fluid catalytically reacts at a surface area in the reaction region thereby generating heat. The heat is transferred to a coolant and the reaction fluid based on the coolant and reaction fluid convective heat transfer coefficients respectively. In one embodiment, the ratio of the coolant convective heat transfer coefficient to the reaction fluid heat transfer coefficient is at least 5:1.

12 Claims, 3 Drawing Sheets

ACTIVELY COOLED EXOTHERMIC REACTOR

FIELD OF THE INVENTION

This invention relates to exothermic reactors, and in more particular applications, to integrated exothermic reactors including heat exchangers for transferring heat to a coolant while minimizing heat transfer to a reaction fluid.

BACKGROUND OF THE INVENTION

In many PEM fuel cell systems, a fuel such as methane or a similar hydrocarbon fuel is converted into a hydrogen-rich stream for the anode side of the fuel cell. In many systems, humidified natural gas (methane) and air are chemically converted to a hydrogen-rich stream known as reformate by a fuel processing subsystem of the fuel cell system. This conversion takes place in a reformer where the hydrogen is catalytically released from the hydrocarbon fuel. A common type of reformer is an Auto-thermal Reactor (ATR), which uses air and steam as oxidizing reactants. As the hydrogen is liberated, a substantial amount of carbon monoxide (CO) is created which must be reduced to a low level (typically less than 10 ppm) to prevent poisoning of the PEM membrane.

The catalytic reforming process consists of an oxygenolysis reaction with an associated water-gas shift [$CH_4 + H_2O \rightarrow CO + 3 H_2$, $CO + H_2O \rightarrow CO_2 + H_2$] and a partial oxidation reaction [$CH_4 + \frac{1}{2}O_2 \rightarrow CO + 2 H_2$]. While the water-gas shift reaction removes some of the CO from the reformate flow stream, the overall reformate stream will always contain some level of CO, the amount being dependent upon the temperature at which the reforming process occurs. After the initial reactions, the CO level of the reformate flow is well above the acceptable level for the PEM fuel cell. To reduce the CO concentration to within acceptable levels, several catalytic reactions will generally be used in the fuel processing subsystem to remove CO in the reformate flow. Typical reactions for reduction of CO in the reformate flow include the aforementioned water-gas shift, as well as a selective oxidation reaction over a precious metal catalyst (with a small amount of air added to the reformate stream to provide oxygen). Generally, several stages of CO cleanup are required to obtain a reformate stream with an acceptable CO level. Each of the stages of CO cleanup requires the reformate temperature be reduced to precise temperature ranges so that the desired catalytic reactions will occur and the loading amount of precious metal catalyst can be minimized.

For CO removal using selective oxidation, a small amount of air is added to the reformate flow to provide oxygen as required by the desired reaction. Additionally, the reformate flow is passed over a precious metal catalyst that is optimized to favor CO removal at specific temperatures. The desired reaction during a selective oxidation process is [$2 CO + O_2 \rightarrow 2 CO_2$]. However, there are other competing reactions that are detrimental to the removal of CO from the reformate stream. Specifically, the other competing reactions are a hydrogen oxidation [$H_2 + \frac{1}{2}O_2 \rightarrow H_2O$] which converts desired hydrogen gas into water, a reverse water-gas shift [$CO_2 + H_2 \rightarrow CO + H_2O$] which creates additional harmful CO as well as depleting the amount of hydrogen gas, and a methanation [$CO_2 + 4 H_2 \rightarrow CH_4 + 2 H_2O$] which also depletes the amount of hydrogen gas in the reformate stream. FIG. 1 shows the reaction selectivity versus temperature for reverse water-gas shift reactions, CO oxidation reactions, and methanation reactions. While the catalyst and initial temperature are chosen to favor the CO oxidation over the reverse water-gas shift and methanation, temperature fluctuations cause the competing reactions to hinder CO removal performance.

In some reactors the desired temperature range for optimal CO oxidation is around 170° C. However, the CO oxidation reaction, the reverse water-gas shift reaction, as well as the methanation reaction are all exothermic, releasing heat as each respective reaction progresses. Therefore, the temperature of the reformate stream increases as much as 100° C. as it passes through a selective oxidation reactor even if the desired selective oxidation reaction initially dominates. As the temperature increases, the reaction selectivity for CO oxidation decreases with respect to the competing reactions, thereby decreasing overall CO removal efficiency.

In this regard, others have chosen to split selective oxidation reactions over multiple units with an intermediate heat exchanger to remove heat to bring the temperature of the reformate stream down to the desired temperature range, thereby bringing the reaction selectivity for CO oxidation towards an optimal level. However, such designs have inherent problems such as complex control required for multiple units and the extra cost and space required for the additional units. These problems are especially troublesome for residential applications where ease of operation and overall space considerations are essential to overall system design.

SUMMARY OF THE INVENTION

It is a primary object of the invention to provide an improved catalytic reactor and method.

In accordance with one form of the invention, a catalytic reactor including a heat exchanger is provided for transferring heat to a coolant and a reaction fluid. The catalytic reactor includes a coolant inlet, a coolant flow path, a coolant outlet, a reaction fluid inlet, a reaction fluid flow path, a reaction fluid outlet, and a reaction region. The reaction region is located within the reaction fluid flow path and in a heat exchange relationship with both the coolant flow path and the reaction fluid flow path such that heat is transferred from the reaction region to the coolant flow path and the reaction fluid flow path concurrently.

In one form, the coolant flow path has a coolant convective heat transfer coefficient ($H_C$), the reaction fluid flow path has a reaction fluid convective heat transfer coefficient ($H_R$), and the ratio of $H_C$ to $H_R$ is in the range of 4:1 to 6:1.

In a preferred form, the ratio of $H_C$ to $H_R$ is in the range of 5:1 to 5.5:1.

According to one form, the coolant flow path has a coolant convective heat transfer coefficient ($H_C$) and a surface area ($A_C$), and the reaction fluid flow path has a reaction fluid convective heat transfer coefficient ($H_R$) and a surface area ($A_R$), and wherein a quantity ($H_C * A_C$)/($H_R * A_R$) is greater than 1.25.

In one form, the quantity is greater than 1.3.

In accordance with one form, a catalytic reactor including a heat exchanger is provided for transferring heat to a coolant and a reaction fluid. The catalytic reactor includes a coolant inlet, a coolant flow path having heat transfer augmentation surfaces, a coolant outlet, a reaction fluid inlet, a reaction fluid flow path having planar surfaces free of heat transfer augmentation surfaces, a reaction fluid outlet, and a catalytic reaction region. The catalytic reaction region is located within the reaction fluid flow path and in a heat exchanger relationship with both the coolant flow path and the reaction fluid flow path such that heat is transferred from the catalytic reaction region to the coolant flow path and the reaction fluid flow path concurrently.

According to one form, the heat transfer augmentation surfaces comprise lanced and offset turbulators.

In accordance with one form, the heat exchanger is an annular heat exchanger.

In one form, the coolant flow path is a multi-pass flow path.

According to one form, the coolant flow path comprises an axial flow path.

In accordance with one form, the reaction fluid flow path is a multi-pass flow path.

In one form, the reaction fluid flow path comprises a radially outward flow path and a radially inward flow path.

According to one form, the planar surfaces are defined by a plurality of plate fins.

In one form, the catalytic reaction region comprises a catalyst layer on the planar surfaces.

In accordance with one form, the catalytic reactor further includes a pre-cooler region located upstream from the catalytic reaction region in the reaction fluid flow path.

According to one form, the coolant flow path has a coolant convective heat transfer coefficient associated with the catalytic reaction region, the reaction fluid flow path has a reaction fluid convective heat transfer coefficient associated with the catalytic reaction region, and the ratio of the coolant convective heat transfer coefficient to the reaction fluid convective heat transfer coefficient is in the range of 4:1 to 6:1.

According to one form, a method is provided for directing heat between a coolant and a reaction fluid. The method includes the steps of:

flowing a coolant through a coolant flow path having a coolant convective heat transfer coefficient;

flowing a reaction fluid through a reaction fluid flow path having a reaction fluid convective heat transfer coefficient;

exothermically reacting at least a portion of the reaction fluid at a reaction region located in the reaction fluid flow path;

transferring a first quantity of heat from the reaction region to the coolant; and transferring a second quantity of heat from the reaction region to the reaction fluid, the first quantity of heat being greater than the second quantity of heat.

In a preferred form, the ratio of the first quantity to the second quantity is greater than 1.25.

According to one form, the ratio of the first quantity to the second quantity is greater than 1.3.

Other objects, advantages, and features will become apparent from a complete review of the entire specification, including the appended claims and drawings.

DETAILED DESCRIPTION OF THE PREFERRED EMBODIMENTS

Figure 1:
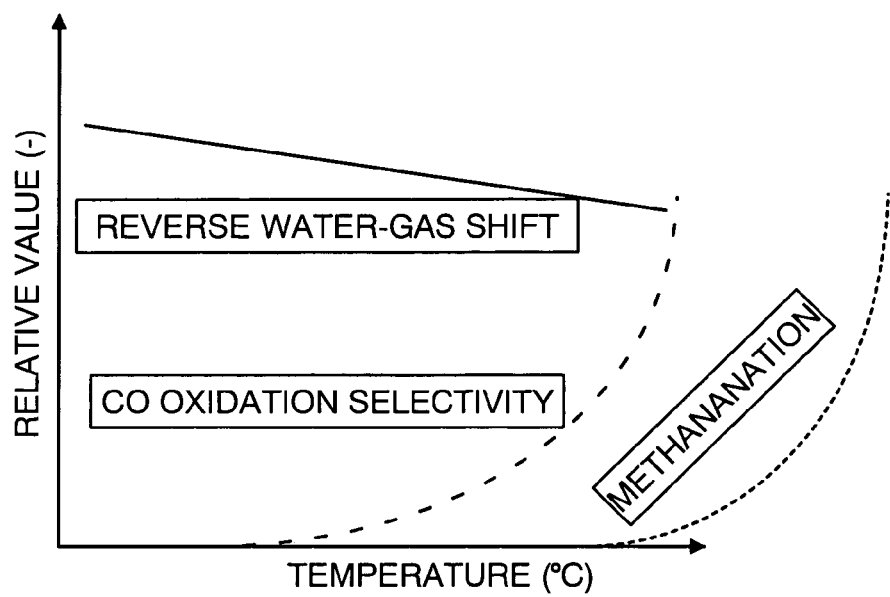
FIG. 1 is a graph representing the relative selectivity of CO oxidation, methanation, and reverse water-gas shift reactions with respect to temperature.

While the present invention is susceptible of embodiment in many different forms, there are shown in the drawings and will be described herein in detail specific embodiments thereof with the understanding that the present disclosure is to be considered as an exemplification of the principles of the invention and is not intended to limit the invention to the specific embodiments illustrated. Specifically, the embodiments provided herein refer to selective oxidation reactors, but the present invention is applicable to all catalytic reaction units capable of utilizing active cooling.

Figure 2:
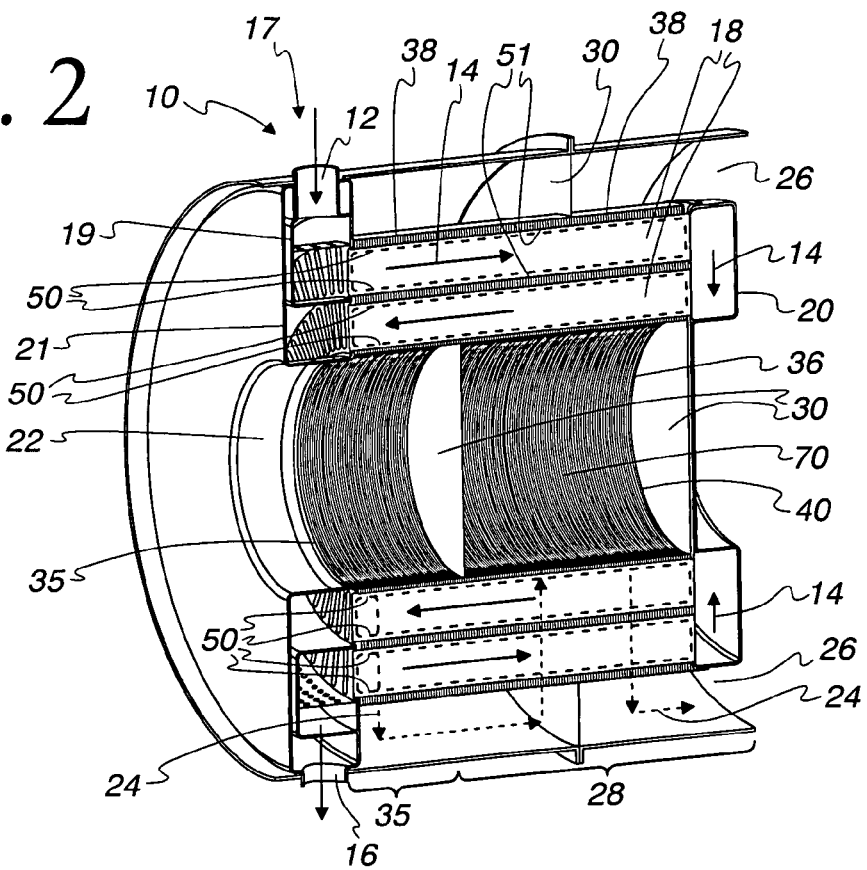
FIG. 2 is a cutaway view of a catalytic reactor embodying the present invention.

A cutaway view of a catalytic reactor 10 embodying the present invention is shown in FIG. 2. The catalytic reactor 10 is shown in FIG. 2 as an annular reactor in a preferred form, but it should be understood by one skilled in the art that in some applications it may be desirable for the catalytic reactor 10 to utilize other suitable heat exchanger constructions. For example, the catalytic reactor 10 may take the form of a stacked plate heat exchanger (not shown) or a planar type tube and fin construction with parallel elongated headers/manifolds for directing coolant to and from the coolant flow tubes.

The catalytic reactor 10 includes a coolant inlet 12, a coolant flow path shown by arrows 14, and a coolant outlet 16 to direct a coolant (not shown) for actively cooling the catalytic reactor 10. It should be understood that by locating the coolant inlet 12 and the coolant outlet 16 on a same end 17 of the catalytic reactor 10, the catalytic reactor 10 is allowed to expand and contract as the temperature of the catalytic reactor 10 changes because the opposite end is free to move. However, this feature may not be desirable in all applications and the inlet 12 and the outlet 16 can be located on opposite ends. The coolant flow path 14 is defined by two concentric annular arrays of flattened tubes 18 that extend between annular manifolds 19, 20, and 21. The catalytic reactor also includes a reaction fluid inlet 22, a reaction fluid flow path 24 shown by dashed arrow lines 24, and a reaction fluid outlet 26 to direct a reaction fluid (not shown), such as a reformate flow, through the catalytic reactor 10. The catalytic reactor 10 further includes a catalytic reaction region 28 located within the reaction fluid flow path 24 and in a heat exchange relationship with both the coolant flow path 14 and the reaction fluid flow path 24. The reaction fluid flow path 24 includes baffles 30 to direct the reaction fluid along the reaction fluid flow path 24. In the illustrated embodiment, the catalytic reaction region 28 extends from a forward most one of the baffles 30 to a rearward most one of the baffles 30. The reaction fluid flow path 24 includes the catalytic reaction region 28 such that the reaction fluid is catalytically reacted when it contacts the reaction region 28.

The present invention provides active cooling of the catalytic reaction region 28 via the coolant flowing through the coolant flow path 14 and the reaction fluid flowing through the reaction fluid flow path 24. Additionally, the present invention biases the heat transfer to the coolant over the heat transfer to the reaction fluid so as to maintain the reaction fluid within a desired temperature range. The heat transfer is manipulated primarily via the coolant convective heat transfer coefficient and the reaction fluid convective heat transfer coefficient.

Additionally, as shown in FIG. 2, the reaction fluid flow path 24 is a multi-pass flow path. Specifically, referring to FIG. 3, the reaction fluid flows from the reaction fluid inlet 22 through a first pass 31, a second pass 32, and a third pass 33 (in directions indicated by the dashed arrows). The reaction fluid flow path 24 may include any number of passes as required. For example, a two-pass reactor is shown in FIG. 4. However, the reaction fluid flow path 24 may include as few passes as a single pass.

Figure 3:
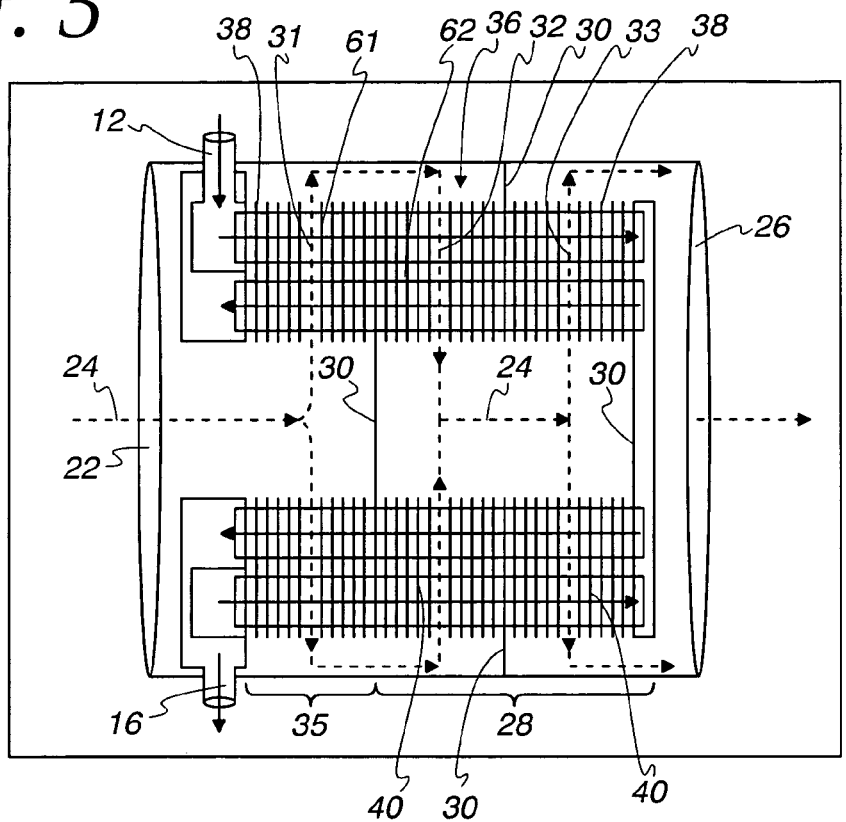
FIG. 3 is a diagrammatic representation of the catalytic reactor of FIG. 2.
Figure 4:
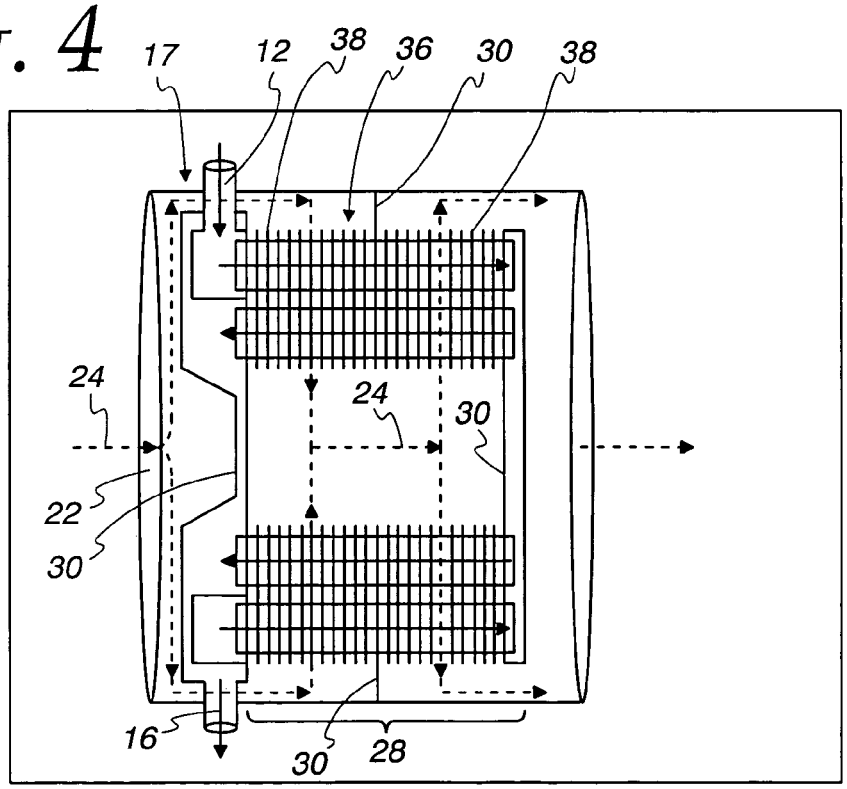
FIG. 4 is a diagrammatic representation of a catalytic reactor embodying the present invention.

Additionally, the embodiment of FIGS. 2 and 3 includes a pre-cooler region 35 located within the reaction flow path 24 to cool the reaction fluid to a desired temperature range prior to entering the catalytic reaction region 28. The pre-cooler region 35 extends from the reaction fluid inlet 22 to the forward most baffle 30. It should be understood that in some applications it may be desirable to not have a pre-cooler region, such as shown by the embodiment of FIG. 4.

The reaction region 28 may be composed of any suitable structure capable of providing a reaction fluid surface area 36. As shown in FIG. 2, the reaction region 28 is composed of a plurality of donut-shaped, planar plate fins 38 through which the tubes 18 extend in good heat exchange contact with the fins 38. While plain plate fins are preferred, other examples of suitable structures include plates, tubes, plain serpentine fins, or similar structures. The surface area 36 is defined by the surface areas of fins 38 in the reaction region 28, and optionally, the exterior surface of the tubes 18 in the reaction region 28. Each fin 38 is separated from adjacent fins 38 by minimal distances such that the contact between the fins 38 and the reaction fluid is maximized. The primary purpose of the fins 38 is to provide a sufficient surface area 36 required for the desired reaction while maintaining a compact overall design for the catalytic reactor 10. The surface area 36 includes a catalytic layer 40 located on the fins 38 exposed to the reaction fluid flow path 24. Optionally, the surface area 36 includes the catalytic layer 40 located on exterior of the tubes 18 in the reaction region 28. The catalytic layer 40 can be any suitable catalytic composition for specific catalytic reactions, such as selective oxidation of CO, many of which are known. The catalyst layer 40 may be applied to the fins 38 located in the reaction region 28 by any conventional method such as dipping, spraying, wash coating, or similar application procedures. Additionally, as the individual fins 38, and thus the catalytic layer 40, are separated by minimal distances, large volumes of reaction fluid are prevented from passing through the catalytic reactor 10 unreacted.

Figure 5:
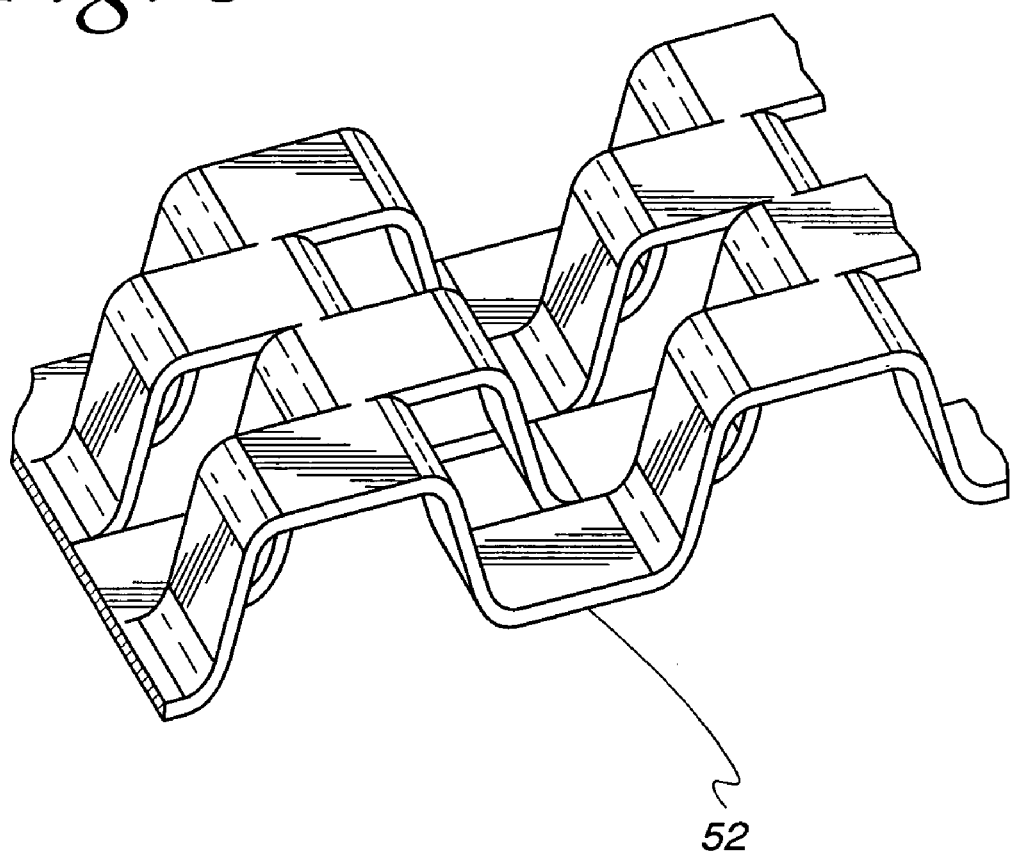
FIG. 5 is a perspective view of one embodiment of an augmentation surface that may be utilized in the present invention.

The coolant flow path 14 includes augmentation surfaces illustrated by dashed blocks 50 located on a coolant surface area 51 defined by the interiors of the tubes 18. An example of the augmentation surfaces 50 is shown in FIG. 5 in the form of lanced and offset turbulators 52 which can be mounted in the tubes 18 in any suitable fashion, many of which are known. Although the augmentation surfaces 50 are shown in FIG. 5 as lanced and offset turbulators 52, the augmentation surfaces 50 may take other suitable forms, such as, for example, serpentine fins or dimpled surfaces formed in the interior of the tubes 18. Additionally, it should be understood by one skilled in the art that the coolant flow path 14 may include any number of passes as required, such as a single pass or multiple passes as required to actively cool the catalytic reactor 10. For example, in the illustrated embodiments, the coolant flow path 14 is a two pass path.

The present invention will be further explained with respect to the coolant and reaction fluid flows through the catalytic reactor 10. Referring to FIG. 3, in one embodiment, the catalytic reactor 10 is a multi-pass reactor having the three passes 31, 32, and 33. The reaction fluid (not shown) enters the catalytic reactor 10 via the reaction fluid inlet 22. The reaction fluid flows through the reaction fluid flow path 24 radially outward via the first pass 31, radially inward via the second pass 32, and radially outward via the third pass 33, exiting the catalytic reactor via the reaction fluid outlet 26. In FIG. 3, the first pass 31 is a pre-cooler pass cooling the reaction fluid to a desired temperature while the second and third passes 32 and 33 include the catalytic layer 40 to catalytically react the reaction fluid. In alternative embodiments, the first pass 31 as well as the second and third passes 32 and 33 can include the catalyst layer 40 to catalytically react the reaction fluid without the aid of the pre-cooler 35.

A coolant (not shown) is concurrently flowing through the catalytic reactor 10. The coolant enters the catalytic reactor 10 via the coolant inlet 12. The coolant flows through the coolant flow path 14 via the manifold 19 which directs the coolant into the tubes 18 defining a first pass 61. After exiting the first pass 61, the coolant enters the manifold 20 which then directs the coolant into the tubes 18 defining a second pass 62, which is radially inward from the first pass 61 but may in some applications be radially outward from the first pass 61. The coolant then flows through the manifold 21 which directs the coolant to the coolant outlet 16. The first and second passes 61 and 62 include the augmentation surfaces 50 to increase the coolant heat transfer.

As the reaction fluid and coolant flow through the catalytic reactor 10, the reaction fluid contacts the catalyst layer 40 in the reaction region 28 and exothermically reacts to produce a desired product flow. In one embodiment, the desired exothermic reaction is selective oxidation of CO. It should be understood by one skilled in the art that the exothermic reaction is taking place at the catalyst layer 40 located on the surface area 36 in the reaction region 28. Therefore, instead of a conventional heat exchanger where heat is transferred from one fluid to another, the present invention is more accurately described as transferring heat from the surface area 36 in the reaction region 28 to both the coolant and the reaction fluid. Because the reaction is exothermic, heat is transferred from the reaction region 28 to the coolant in the coolant flow path 14 adjacent the reaction region 28 and to the reaction fluid in the reaction fluid flow path 24 adjacent the catalyst layer 40 in the reaction region 28.

In exothermic reactors lacking active cooling, such as conventional selective oxidation reactors, as the exothermic reaction proceeds, the liberation of heat causes the reaction fluid to increase in temperature along the length of the reactor. As previously discussed, exothermic reactions are optimized at specific temperature ranges to increase the production of the desired products and minimize the rate of competing reactions. To maintain the reaction fluid flow temperature within a desired range, a conventional selective oxidation reactor is usually split into multiple units with intermediate heat exchange units.

However, the present invention does not require selective oxidation reactors to be interrupted by a heat exchange unit because the catalytic reactor 10 includes active cooling via the coolant flow path 14 while the exothermic reaction proceeds. The liberated heat is actively transferred to the coolant flow and the reaction fluid flow.

Ideally, the reaction fluid flow would be isothermal, but some heat is transferred from the catalytic reaction region 28 to the reaction fluid flow. Specifically, it would be ideal in CO oxidation reactions, where it is critical to maintain the desired temperature range of the reaction fluid, for the reaction fluid to be isothermal throughout the entire catalytic reactor 10. However, this is not the case and some heat is transferred to the reaction fluid. But, the present invention is designed to minimize the heat transfer to the reaction fluid.

Specifically, the present invention is designed to optimize the thermal resistance ratio $[(H_C \cdot A_C)/(H_R \cdot A_R)]$ where $H_C$ represents the coolant convective heat transfer coefficient, $A_C$ represents the coolant surface area 51, $H_R$ represents the reaction fluid convective heat transfer coefficient, and $A_R$ represents the reaction fluid surface area 36 in the reaction region 28.

However, other factors must also be considered when designing a catalytic reactor 10, such as a selective oxidation reactor. Specifically, the reaction residence time must be considered. If the reaction fluid flows too quickly through the reaction region 28, thereby having insufficient residence time, the CO oxidation will be incomplete and the reaction fluid will contain an unacceptable amount of poisonous CO. If the reaction fluid flows too slowly through the reaction region 28, thereby having too great of a residence time, the competing water-gas shift reaction discussed previously will limit CO oxidation. Therefore, the reaction residence time is a critical consideration for designing a catalytic reactor. In this regard, the reaction fluid surface area 36 in the reaction region 28 and the volume 70 of the reaction fluid flow path 24 in the reaction region 28, which for a given flow rate will determine residence time, are critical design parameters. Additionally, another design consideration is maximizing the surface area 36 of the reaction region 28 per unit volume to minimize the overall size of the catalytic reactor 10. Therefore, in light of these considerations, the surface area 36 of the reaction region 28 is not easily manipulated to adjust the thermal resistance ratio $[(H_C \cdot A_C)/(H_R \cdot A_R)]$.

As a consequence to the design limitations placed upon the catalytic reactor 10 by the surface area 36, the volume 70 of the reaction fluid flow path 24, and the overall catalytic reactor 10 size, the coolant surface area 51 is not easily manipulated because the coolant surface area 51 is directly and indirectly affected by the above design limitations. However, the ratio $[A_C/A_R]$ can be maximized while still maintaining the overall catalytic reactor size. In one embodiment based on FIG. 3, the ratio $[A_C/A_R]$ is 0.275.

Therefore, in light of the above design limitations, to optimize the thermal resistance ratio, the convective heat transfer coefficients must be manipulated such that the coolant convective heat transfer coefficient $H_C$ is maximized while the reaction fluid heat transfer coefficient $H_R$ is minimized. To achieve this condition, the present invention utilizes the augmentation surfaces 50 provided on the coolant surface area 51 while no augmentation surfaces are utilized on the reaction fluid surface area 36 in the reaction region 28. The resulting ratio of $[H_C/H_R]$ is thereby maximized. In the illustrated embodiments, the ratio $[H_C/H_R]$ is preferably in the range of 4:1 to 6:1, more preferably in the range of 5:1 to 5.5:1, and the ratio of 5.32:1 can be achieved by utilizing the lanced and offset turbulators 52 and the plain plate fins 38 in constructions based on FIGS. 2-4. It should be understood that augmentation surfaces can exist on the reaction fluid surface area so long as the coolant convective heat transfer coefficient $H_C$ is greater than the reaction fluid heat transfer coefficient $H_R$.

By maximizing the ratio of the surface areas and the ratio of the convective heat transfer coefficients, the thermal resistance ratio is maximized, therefore maximizing the quantity of heat transferred to the coolant and minimizing the quantity of heat transferred to the reaction fluid. Preferably, the thermal resistance ratio is greater than 1.25 and in highly preferred embodiments, the thermal resistance ratio is 1.3. In one embodiment of the illustrated catalytic reactor 10, the thermal resistance ratio is 1.463.

In a computer model of a catalytic reactor based on FIG. 4, a coolant and a reaction fluid were flowed through the catalytic reactor. The coolant flow rate was 640 g/sec with an inlet temperature of 155° C. The reaction fluid (a reformate stream from an auto-thermal reactor) had a flow rate of 107 g/sec with an inlet temperature of 167° C. The reaction fluid flowed through the catalytic reaction region 28 thereby generating 17.1 kW on the surface area 36 in the reaction region 28. Assuming a uniform reaction across the surface area 36 in the reaction region 28, the reformate fluid temperature ranged from 165° C. to 170° C. in the catalytic reaction region 28 while the catalyst layer 40 ranged from 164° C. to 171° C., therefore maintaining the reaction within a 7° C. range. Assuming a more exponential distribution of the reaction across the surface area 36 in the catalytic reaction region 28, such that 69.2% of the heat is generated in the first 25% of the surface area 36 encountered in the catalytic reaction region 28, 23.1% is generated on the second 25%, 7.7% is generated on the third 25%, and no heat is generated on the last 25% of the surface area 36 encountered in the catalytic reaction region 28, the reformate fluid temperature ranged from 163° C. to 177° C. in the catalytic reaction region 28 while the catalyst layer 40 ranged from 163° C. to 183° C., therefore maintaining the reaction within a 20° C. range.

Thus it can be seen that by actively cooling the catalytic reaction region 28 and biasing the heat transfer towards the coolant over the reaction fluid, the catalytic reactor 10 can eliminate or reduce the need for intermediate heat exchangers between multiple exothermic catalytic reactors, such as selective oxidizers.

It should be understood that while the catalytic reactor 10 is described herein as particularly advantageous for CO selective oxidation reactors, the catalytic reactor 10 may find use in any number of exothermic catalytic reactors. Accordingly, no limitation to use with selective oxidation reactors is intended unless specifically recited in the claims.

What is claimed is:

1. A catalytic reactor including a heat exchanger for transferring heat to a coolant and a reaction fluid, the catalytic reactor comprising:
   a coolant inlet, a coolant flow path having heat transfer augmentation surfaces, and a coolant outlet;
   a reaction fluid inlet, a reaction fluid flow path having planar surfaces free of heat transfer augmentation surfaces, and a reaction fluid outlet; and
   a catalytic reaction region located within the reaction fluid flow path and in a heat exchange relationship with both the coolant flow path and the reaction fluid flow path such that heat is transferred from the catalytic reaction region to the coolant flow path and the reaction fluid flow path concurrently.

2. The catalytic reactor of claim 1 wherein the heat transfer augmentation surfaces comprise lanced and offset turbulators.

3. The catalytic reactor of claim 1 wherein the heat exchanger is an annular heat exchanger.

4. The catalytic reactor of claim 1 wherein the coolant flow path is a multi-pass flow path.

5. The catalytic reactor of claim 4 wherein the coolant flow path comprises an axial flow path.

6. The catalytic reactor of claim 1 wherein the reaction fluid flow path is a multi-pass flow path.

7. The catalytic reactor of claim 6 wherein the reaction fluid flow path comprises a radially outward path and a radially inward path.

8. The catalytic reactor of claim 7 wherein the coolant flow path comprises an axial flow path.

9. The catalytic reactor of claim 1 wherein said planar surfaces are defined by a plurality of plate fins.

10. The catalytic reactor of claim 1 wherein the catalytic reaction region comprises a catalyst layer on said planar surfaces.

11. The catalytic reactor of claim 1 further comprising a pre-cooler region located upstream from the catalytic reaction region in the reaction fluid flow path.

12. The catalytic reactor of claim 1 wherein the coolant flow path has a coolant convective heat transfer coefficient associated with the catalytic reaction region, the reaction fluid flow path has a reaction fluid convective heat transfer coefficient associated with the catalytic reaction region, and wherein the ratio of the coolant convective heat transfer coefficient to the reaction fluid convective heat transfer coefficient is in the range of 4:1 to 6:1.

* * * * *

UNITED STATES PATENT AND TRADEMARK OFFICE
CERTIFICATE OF CORRECTION

PATENT NO. : 7,648,686 B2  Page 1 of 1
APPLICATION NO. : 10/818298
DATED : January 19, 2010
INVENTOR(S) : Reinke et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Twenty-third Day of November, 2010

David J. Kappos
*Director of the United States Patent and Trademark Office*